United States Patent [19]

Hoegerle

[11] Patent Number: 4,952,679
[45] Date of Patent: Aug. 28, 1990

[54] FIBER-REACTIVE DYES CONTAINING A 5-FORMYLPYRIMIDINE MOIETY

[75] Inventor: Karl Hoegerle, Basel, Switzerland

[73] Assignee: Ciba-Geigy Corporation, Ardsley, N.Y.

[21] Appl. No.: 233,782

[22] Filed: Aug. 19, 1988

[30] Foreign Application Priority Data

Aug. 27, 1987 [CH] Switzerland .................. 3289/87

[51] Int. Cl.$^5$ .............. C09B 62/20; C09B 62/22; C09B 62/24; C09B 62/26; C09B 62/038; D06P 3/66
[52] U.S. Cl. .................. 534/618; 534/617; 534/619; 534/620; 534/621; 534/622; 534/623; 534/624; 534/625; 534/627; 534/628; 534/629; 534/638; 534/631; 534/632; 534/633; 534/634; 534/635; 534/636; 534/637; 544/99; 544/225; 544/243; 544/302; 544/303; 544/309; 544/315; 544/323; 544/330; 544/335
[58] Field of Search .................. 534/617–635; 544/99, 225, 243, 302, 303, 309, 315, 323, 330, 334, 335

[56] References Cited

U.S. PATENT DOCUMENTS 4,709,018 11/1987 Seitz .................. 534/618

FOREIGN PATENT DOCUMENTS 2310334  9/1973  Fed. Rep. of Germany ...... 534/618
3603797  8/1987  Fed. Rep. of Germany ...... 534/618

OTHER PUBLICATIONS

H. Bredereck et al., Liebigs Ann. Chem., 766, 73–88 (1972).
Chem. Abstracts, 78, 97586s (1973).
Chem. Abstracts, 108, 108: 7511z (1988).
Chem. Abstracts, 79, 146549p (1973).

Primary Examiner—Floyd D. Higel
Attorney, Agent, or Firm—George R. Dohmann

[57] ABSTRACT

Reactive dyes suitable for dyeing and printing cellulosic fiber materials by the cold pad-batch process having the formula

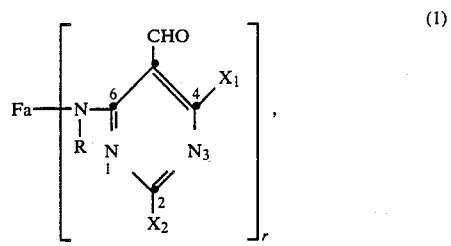

wherein Fa is a monoazo or polyazo, metal complex azo, anthraquinone, phthalocyanine, formazane, azomethine, dioxazine, phenazine, stilbene, triphenylmethane, xanthene, thioxanthone, nitroaryl, naphthoquinone, pyrenequinone or perylenetetracarbimide dye radical, $X_1$ is halogen, $C_1$–$C_4$-alkylsulfonyl, phenylsulfonyl, a sulfonic acid or phosphoric acid group or a quaternized ammonium group, $X_2$ independently has the meaning of $X_1$ or is $C_1$–$C_4$-alkyl which is unsubstituted or substituted by halogen, hydroxy, cyano, carboxyl, sulfo, sulfato, $C_1$–$C_4$-alkoxycarbonyl or $C_1$–$C_4$alkoxy, R is hydrogen or $C_1$–$C_4$-alkyl which is unsubstituted or substituted by halogen, hydroxy, cyano, carboxyl, sulfo, sulfato, $C_1$–$C_4$-alkoxycarbonyl or $C_1$–$C_4$-alkoxy, and r is 1 or 2.

19 Claims, No Drawings

FIBER-REACTIVE DYES CONTAINING A 5-FORMYLPYRIMIDINE MOIETY

The present invention relates to novel reactive dyes, to processes for their preparation and to the use thereof for dyeing or printing fibre materials.

The practice of dyeing with reactive dyes has given rise in recent times to more stringent requirements being made of the quality of the dyeings and the economy of the dyeing process. For this reason there is still a need for novel reactive dyes with improved properties, especially application properties.

For dyeing cotton by the cold pad-batch process it is necessary at the present time to use reactive dyes which have a sufficient substantitivity adapted to the low dyeing temperature and which at the same time have the property of being easily washed off to remove non-fixed dye. The dyes should also have high reactivity, so that only short batching times are necessary, and, in particular, they should give dyeings with high degrees of fixation. These requirements are only insufficiently fulfilled by known dyes.

Accordingly, the object of the present invention is to provide novel improved reactive dyes for the cold pad-batch process which have the above-specified qualities to a high degree. The novel dyes should be distinguished in particular by high fixation yields and high dye-fibre bond stability, and they should further have the property of being easily washed off to remove non-fixed dye. They should also produce dyeings with good general fastness properties, for example lightfastness and wetfastness.

It has been found that this object is accomplished with the novel reactive dyes defined below.

The invention relates to reactive dyes of the formula

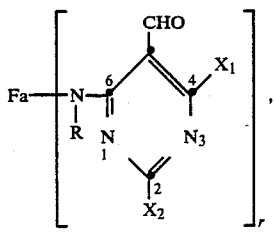

(1)

wherein Fa is the radical of an organic dye of the monoazo or polyazo, metal complex azo, anthraquinone, phthalocyanine, formazane, azomethine, dioxazine, phenazine, stilbene, triphenylmethane, xanthene, thioxanthone, nitroaryl, naphthoquinone, pyrenequinone or perylenetetracarbimide series, $X_1$ is a removable substituent, $X_2$ independently has the meaning of $X_1$ or is substituted or unsubstituted $C_1$–$C_4$-alkyl, R is hydrogen or substituted or unsubstituted $C_1$–$C_4$-alkyl and r is 1 or 2.

The radical Fa in formula (1) can contain, bonded to its skeleton, the substituents conventionally found in organic dyes.

Examples of suitable substituents in the radical Fa are: $C_1$–$C_4$-alkyl, which generally includes methyl, ethyl, n- or iso-propyl or n-, sec- or tert-butyl; $C_1$–$C_4$-alkoxy, which will generally be understood as meaning methoxy, ethoxy, n- or iso-propoxy or n-, sec- or tert-butoxy; $C_1$–$C_4$-alkanoylamino, especially acetylamino or propionylamino; benzoylamino; amino; N-mono- or N,N-di-$C_1$–$C_4$-alkylamino, it being possible for the alkyl to be further substituted e.g. by —OH, —OCOCH$_3$, —OSO$_3$H, —CN or halogen, e.g. methylamino, ethylamino, n- or iso-propylamino, n-, sec- or tert-butylamino, N,N-di-β-hydroxyethylamino, N,N-di-β-sulfatoethylamino, hydroxypropylamino, β-sulfatoethylamino, β-chloroethylamino or β-acetoxyethylamino; phenylamino; mono- or disulfobenzylamino; $C_1$–$C_4$-alkoxycarbonyl, e.g. methoxy- or ethoxycarbonyl; $C_1$–$C_4$-alkylsulfonyl, e.g. methyl- or ethyl-sulfonyl; trifluoromethyl; nitro; cyano; halogen, which will generally be understood as meaning fluorine, chlorine and bromine; carbamoyl; N-mono- or N,N-di-$C_1$–$C_4$-alkyl-carbamoyl; sulfamoyl; N-mono- or N,N-di-$C_1$–$C_4$-alkyl-sulfamoyl; N-(β-hydroxyethyl)sulfamoyl; N,N-di(β-hydroxyethyl)sulfamoyl; N-phenylsulfamoyl; hydroxyl; carboxyl; sulfo; sulfomethyl and ureido.

Fa is preferably the radical of an organic dye of the monoazo or polyazo, metal complex azo, anthraquinone, phthalocyanine, formazane or dioxazine series, which is substituted by one or more of the above-mentioned radicals.

The radicals Fa most preferably contains one or more sulfo groups and can also be further substituted by one or more of the above-mentioned radicals.

Fa as the radical of a monoazo or disazo dye is most preferably substituted by one or more radicals selected from the group consisting of methyl, ethyl, methoxy, ethoxy, acetylamino, benzoylamino, amino, chlorine, bromine, ureido, hydroxyl, carboxyl, sulfomethyl and sulfo.

R as a substituted $C_1$–$C_4$-alkyl radical can be e.g. a $C_1$–$C_4$-alkyl radical substituted by halogen, hydroxyl, cyano, carboxyl, sulfo, sulfato, $C_1$–$C_4$-alkoxycarbonyl or $C_1$–$C_4$-alkoxy.

Examples of substituted $C_1$–$C_4$-alkyl radicals are: carboxymethyl, β-carboxyethyl, methoxycarbonylmethyl, ethoxycarbonylmethyl, β-methoxyethyl, β-ethoxyethyl, β-chloroethyl, γ-bromopropyl, γ-chloropropyl, β-hydroxyethyl, β-hydroxybutyl, β-cyanoethyl, sulfomethyl, β-sulfoethyl and β-sulfatoethyl.

R is preferably methyl or ethyl and in particular hydrogen.

As removable substituents, $X_1$ and $X_2$ independently of one another are e.g. a halogen atom such as fluorine, chlorine or bromine, a $C_1$–$C_4$-alkylsulfonyl group such as methyl- or ethyl-sulfonyl, the phenyl-sulfonyl radical, a sulfonic acid or phosphonic acid group or a quaternized ammonium group.

As removable substituents, $X_1$ and $X_2$ independently of one another are preferably fluorine or chlorine and most preferably chlorine in each case.

$X_2$ as an alkyl radical is a $C_1$–$C_4$-alkyl radical which is unsubstituted or substituted e.g. by halogen, hydroxyl, cyano, carboxyl, sulfo, sulfato, $C_1$–$C_4$-alkoxycarbonyl or $C_1$–$C_4$-alkoxy; it is preferably a methyl, ethyl or n- or iso-propyl radical which is unsubstituted or substituted by fluorine, chlorine, hydroxyl, sulfo or sulfato, and most preferably methyl or ethyl.

A preferred group of dyes of the invention comprises compounds of formula (1) wherein $X_1$ and $X_2$ are each fluorine or chlorine.

Another group of preferred dyes of the invention consists of compounds of formula (1) wherein $X_1$ is fluorine or chlorine and $X_2$ is methyl or ethyl.

The part of formula (1) which is enclosed in square brackets is a reactive radical which can occur once or twice in the molecule; when r=2, the two reactive radicals can be identical or different; the two radicals are preferably identical.

Reactive dyes of formula (1) wherein r=1 are especially preferred.

The compounds of formula (1) are fibre-reactive. Fibre-reactive compounds will be understood as meaning compounds which are capable of reacting with the hydroxyl groups of cellulose, the amino, carboxyl, hydroxyl and thiol groups of wool and silk or with the amino groups and, if appropriate, carboxyl groups of synthetic polyamides to form covalent chemical bonds.

A preferred group of reactive dyes of the invention comprises compounds of formula (1) given above wherein Fa is the radical of an organic dye of the monoazo or polyazo, metal complex azo, anthraquinone, phthalocyanine, formazane or dioxazine series, which carries one or more sulfo groups and can also be further substituted by one or more of the above-mentioned radicals, R is hydrogen or a $C_1$–$C_4$-alkyl radical which is unsubstituted or substituted e.g. by halogen, hydroxyl, cyano, carboxyl, sulfo, sulfato, $C_1$–$C_4$-alkoxycarbonyl or $C_1$–$C_4$-alkoxy, $X_1$ is chlorine or fluorine, $X_2$ is chlorine, fluorine or a methyl, ethyl or n- or iso-propyl radical which is unsubstituted or substituted by fluorine, chlorine, hydroxyl, sulfo or sulfato, and r is 1.

An especially preferred embodiment of the present invention relates to reactive dyes of the formula

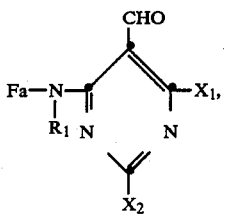
(1a)

wherein Fa has the meanings and preferences indicated previously, $R_1$ is hydrogen, methyl or ethyl, $X_1$ is chlorine or fluorine and $X_2$ is chlorine, fluorine, methyl or ethyl.

Preferred subgroups of the reactive dyes of formula (1) are:

(a) Monoazo or disazo dyes of the formula

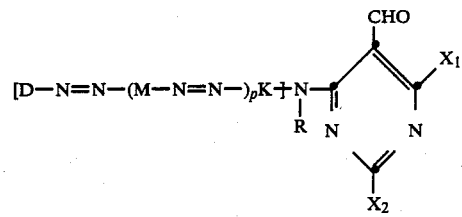
(2)

or of the formula

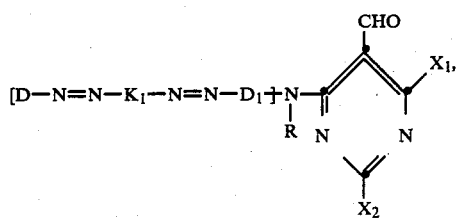
(3)

wherein R, $X_1$ and $X_2$ each have the meanings and preferences indicated previously, D and $D_1$ independently of one another are a diazo component of the benzene or naphthalene series, M is a middle component of the benzene or naphthalene series, K is a coupling component of the benzene or naphthalene series or of the heterocyclic series, $K_1$ is the radical of a coupling component of the aminonaphtholsulfonic acid series and p is 0 or 1.

Subgroups of the reactive dyes of formula (2) are: compounds of the formula

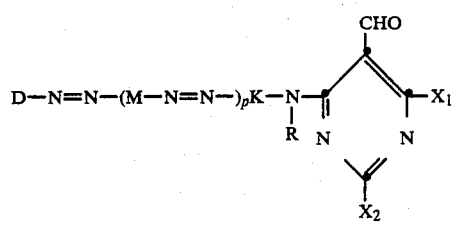
(2a)

and compounds of the formula

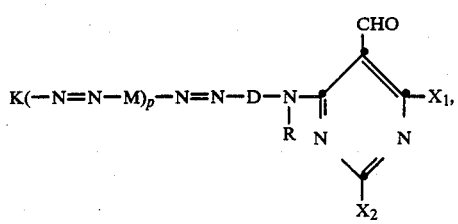
(2b)

wherein R, $X_1$, $X_2$, K, D, M and p are each as defined above.

Consideration should also be given to reactive dyes of formulae (2), (2a), (2b) and (3) wherein the radicals D, $D_1$ and/or K contain yet another reactive radical, so that trireactive and tetrareactive dyes are also included. The additional reactive radicals contained in D, $D_1$ or K can be bonded to D, $D_1$ or K via an amino group or in some other way, e.g. by a direct bond.

An additional reactive radical which may be contained in a D, $D_1$ or K is in particular a low-molecular alkanoyl or alkylsulfonyl radical substituted by a removable atom or a removable group, a low-molecular alkenoyl or alkenesulfonyl radical which may be substituted by a removable atom or a removable group, a carbocyclic or heterocyclic radical containing 4, 5 or 6 rings, substituted by a removable atom or a removable group and bonded via a carbonyl or sulfonyl group, or a triazine or pyrimidine radical substituted by a removable atom or a removable group and bonded direct via a carbon atom, or contains such a radical. Examples of these types of reactive radical are a six-membered heterocyclic radical containing halogen atoms and bonded via an amino group, such as a halogenotriazine or halogenopyrimidine radical, or an aliphatic acyl radical such as a halogenoacetyl or halogenopropionyl radical.

The additional reactive radical is in particular a vinylsulfonyl, β-sulfatoethylsulfonyl, β-thiosulfatoethylsulfonyl, β-chloroethylsufonyl or β-acetoxyethylsulfonyl radical bonded direct or via a bridging link.

The above explanations also apply analogously to metal complex azo dyes and to other chromophores mentioned in the definition of the dye radical D in formula (1).

The radicals D and D₁ can be derived e.g. from the following diazo components:

aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 1-aminobiphenyl, 1-aminobenzene-2-, -3- or -4-carboxylic acid, 2-aminodiphenyl ether, 1-aminobenzene-2-, -3- or -4-sulfonamide, 1-aminobenzene-2-, -3- or -4-sulfonic acid, 1-aminobenzene-2,4- and -2,5-disulfonic acid, 1-amino-4-methylbenzene-2-sulfonic acid, 1-amino-4-methoxybenzene-2-sulfonic acid, 1-amino-4-ethoxybenzene-2-sulfonic acid, 1-amino-3-methylbenzene-6-sulfonic acid, 1-amino-6-methylbenzene-3- or -4-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 1-aminonaphthalene-3,6- or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 4-aminoazobenzene-3,4'-disulfonic acid, 3-methoxy-4-amino-6-methylazobenzene-2',4'-disulfonic acid, 3-methoxy-4-amino-6-methylazobenzene-2',5'-disulfonic acid, 1-amino-4-β-sulfatoethylsulfonylbenzene, 1-amino-4-vinylsulfonylbenzene, 1-amino-3-vinylsulfonylbenzene, 1-amino-4-β-sulfatoethylsulfonylbenzene-2-sulfonic acid, 1-amino-4-[β-(β'-chloroethylsulfonyl)ethylaminocarbonyl]benzene-2-sulfonic acid, 1-amino-4-β(vinylsulfonyl)ethylaminocarbonylbenzene-2-sulfonic acid, 1-amino-3-γ-(vinylsulfonyl)butyrylaminobenzene-6-sulfonic acid, 1-amino-3 -vinylsulfonyl-6-methoxybenzene, 1-amino-3-β-(vinylsulfonyl)ethylaminocarbonyl-6-methoxybenzene and 1-amino-3-β-(vinylsulfonyl)ethylaminocarbonylbenzene; and also diaminobenzenes or diaminonaphthalenes, such as 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 1,4-diaminobenzene-2-carboxylic acid, 1,3-diaminobenzene-4-carboxylic acid, 1-amino-3-aminomethylbenzene-6-sulfonic acid, 1-amino-3-aminomethyl-4-methoxybenzene-2-sulfonic acid, 2,6-diaminonaphthalene-4,8-disulfonic acid, 2-amino-5-aminomethylnaphthalene-1-sulfonic acid and 2-amino-5-aminomethylnaphthalene-1,7-disulfonic acid; instead of a diamine, it is also possible to use an aminoacetylamino compound from which the acetyl group is subsequently eliminated by saponification, e.g. 1-acetylamino-3-aminobenzene-4-sulfonic acid or 1-acetylamino-4-aminobenzene-3-sulfonic acid.

The radical M can be derived e.g. from the following intermediate components:

aniline; m-toluidine; 2,5-dimethyl- or -dimethoxy-aniline; m-aminoanisole; m-acetylamino-, m-propionylamino-, m-butyrylamino- or m-benzoylaminoaniline; m-aminophenylurea; 4-acetamino-2-amino-toluene or -anisole; 2-amino-4-methylanisole; 1-aminonmaphthalene-6- or 7-sulfonic acid; 2-amino-4-acetylaminobenzenesulfonic acid; 2-acid-5-naphthol-7-sulfonic acid; 2-amino-8-naphthol-6-sulfonic acid; 2-(4-aminobenzoylamino)-5-naphthol-7-sulfonic acid and 3-sulfo-4-aminoacetoacetanilide.

The following are examples of the large number of possible coupling components K and K₁:

phenol, 1-hydroxy-3- or -4-methylbenzene, 1-hydroxybenzene-4-sulfonic acid, 1-hydroxynaphthalene, 2-hydroxynaphthalene, 2-hydroxynaphthalene-6- or -7-sulfonic acid, 2-hydroxynaphthalene-3,6- or -6,8-disulfonic acid, 1-hydroxynaphthalene-4-sulfonic acid, 1-hydroxynaphthalene-4,6-or -4,7-disulfonic acid, 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminoinaphthalene-5,7-disulfonic acid, 1-amino-8-hydroxynaphthalene-4-sulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydrxynaphthalene-2,4,6-trisulfonic acid, 1-hydroxy-8-acetylaminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- or 2-ethyl-amino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or 2-ethyl-amino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6-or -4,6-disulfonic acid, 1-acetylamino-8-hydroxynaphthalene-3,6- or -4,6-disulfonic acid, 1-(4'-aminobenzoylamino)-8-hydroxynaphthalene-3,6- or -4,6-disulfonic acid, 1-(4'-nitrobenzoylamino)-8-hydroxynaphthalene-3,6- or -4,6-disulfonic acid, 1-(3'-aminobenzoylamino)-8-hydroxynapthalene-3,6-or -4,6-disulfonic acid, 1-(3'-nitrobenzoylamino)-8-hydroxynaphthalene-3,6- or -4,6-disulfonic acid, 2-(4'-amino-3'-sulfophenylamino)-5-hydroxynaphthalene-7-sulfonic acid, 3-methyl-pyrazol-5-one, 1-phenyl-3-methylpyrazol-5-one, 1-(4'-sulfophenyl)-3-methylpyrazol-5-one, 1-(4'-sulfophenyl)pyrazol-5-one -3-carboxylic acid, 1-(3'-aminophenyl)-3-methylpyrazol-5-one, 1-(2',5'-disulfophenyl)-3-methylpyrazol-5-one, 1-(2'-methyl-4'-sulfophenyl)pyrazol-5-one-3-carboxylic acid, 1-(4',8'-disulfonaphth-2'-yl)-3-methylpyrazol-5-one, 1-(5',7'-disulfonaphth-2'-yl)-3-methylpyrazol-5-one, 1-(2',5'-dichloro-4'-sulfophenyl)-3-methylpyrazol-5-one, 3-aminocarbonyl-4-methyl-6-hydroxypyrid-2-one, 1-ethyl-3-cyano- or -3-chloro-4-methyl-6-hydroxypyrid-2-one, 1-ethyl-3-sulfomethyl-4-methyl-6-hydroxypyrid-2-one, 2,4,6-triamino-3-cyanopyridine, 2-(3'-sulfophenylamino)-4,6-diamino-3-cyanopyridine, 2-(2'-hydroxyethylamino)-3-cyano-4-methyl-6-aminopyridine, 2,6-bis(2'-hydroxyethylamino)-3-cyano-4-methylpyridine, 1-ethyl-3-carbamoyl-4-methyl-6-hydroxypyrid-2-one, 1-ethyl-3-sulfomethyl-4-methyl-5-carbamoyl-6-hydroxypyrid-2-one, N-acetoacetylaminobenzene, 1-(N-acetoacetylamino)-2-methoxybenzene-5-sulfonic acid, 4-hydroxyquinol-2-one, 1-amino-8-hydroxy-2-(phenylazo)naphthalene-3,6-disulfonic acid, 1-amino-8-hydroxy-2-(4'-sulfophenylazo)naphthalene-3,6-disulfonic acid, 1-amino-8-hydroxy-2-(2',5'-disulfophenylazo)naphthalene-3,6-disulfonic acid, 1-β-aminoethyl-3-cyano-4-methyl-6-hydroxypyrid-2-one, 1-γ-aminopropyl-3-sulfomethyl-4-methyl-6-hydroxypyrid-2-one, 1,3-diaminobenzene, 1-amino-3-N,N-di-β-hydroxyethylaminobenzene, 1-amino-3-N,N-di-β-sulfatoethylaminobenzene, 1-amino-3-N,N-di-β-hydroxyethylamino-4-methoxybenzene, 1-amino-3-N,N-di-β-sulfatoethylamino-4-methoxybenzene, 1-amino-3-sulfobenzylaminobenzene, 1-amino-3-sulfobenzylamino-4-chlorobenzene, 1-amino-3-N,N-disulfobenzylaminobenzene, N,N-di(β-sulfatoethyl)aniline, 3-acetylamino-N,N-di(β-sulfatoethyl)aniline, 3-methyl-N,N-di(β-sulfatoethyl)aniline, N-ethyl-N-(-62-hydroxyethyl)aniline, N-ethyl-N-(β-acetoxyethyl)aniline, 3-acetylamino-N,N-di(β-hydroxyethyl)aniline, 3-methyl-N,N-di(β-acetoxyethyl)aniline, 2-methoxy-5-acetylamino-N-(β-acetoxyethyl)-N-benzylaniline, 2-chloro-5-acetylamino-N(γ-phenoxy-β-hydroxy-n-propyl)aniline, 3-ureidoaniline, N-ethyl-N-(3'-sulfobenzyl)aniline, 3-methyl-N-ethyl-N-(β-sulfatoethyl)aniline, 3-methyl-N,N-di(β-hydroxyethyl)aniline and 3-methyl-6-methoxy-N,N-di(β-hydroxyethyl)aniline.

If the reactive dyes of the invention have the formula (2) or (3) and accordingly Fa in formula (1) is the radical of a monoazo or disazo compound, this radical can be derived e.g. from the following organic monoazo or disazo dyes:

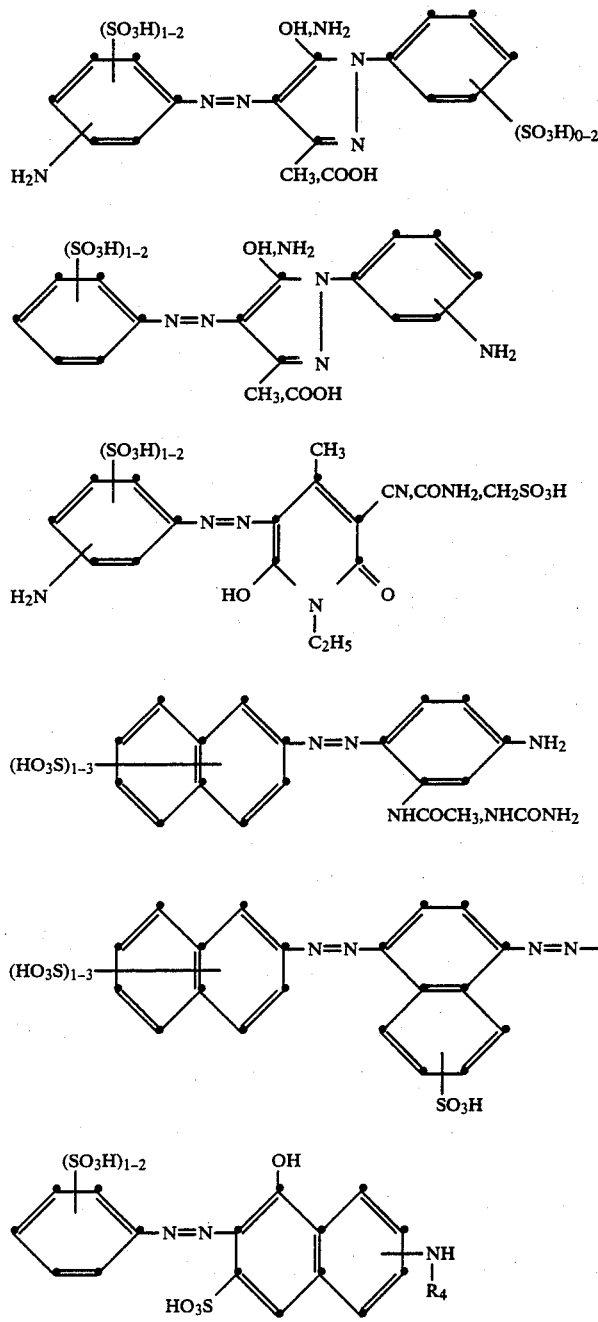

-continued
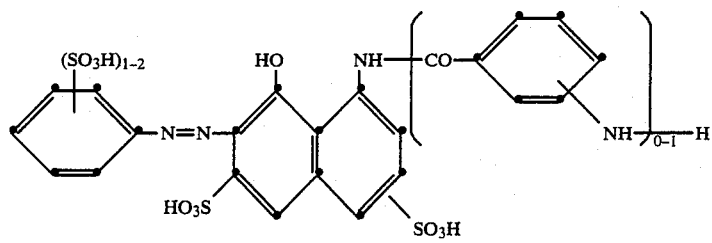
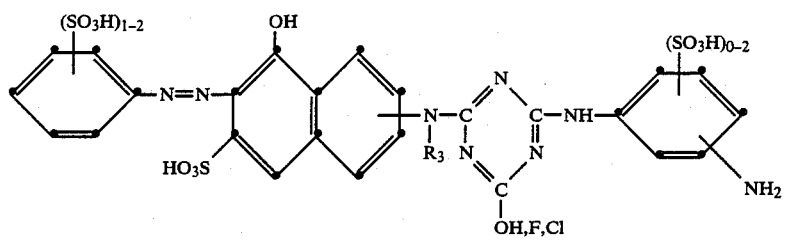
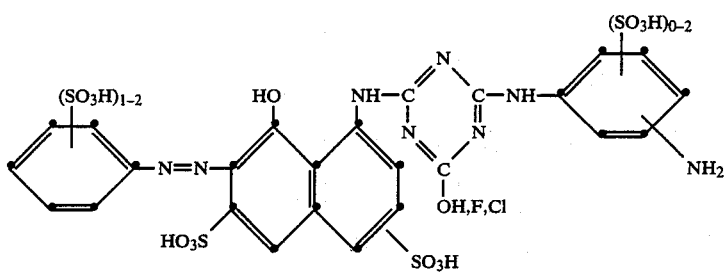
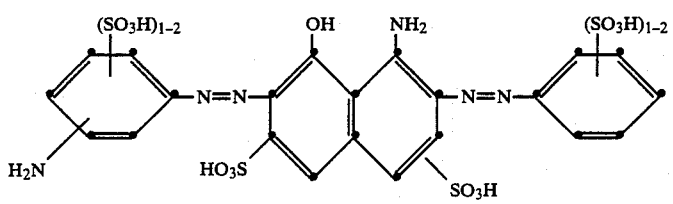
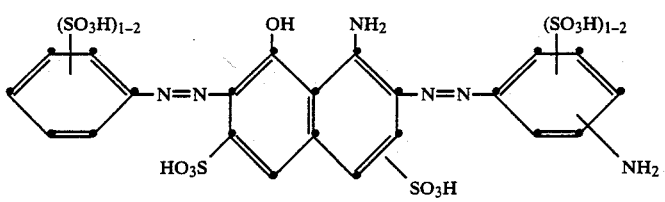
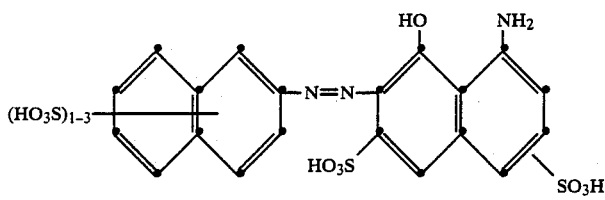
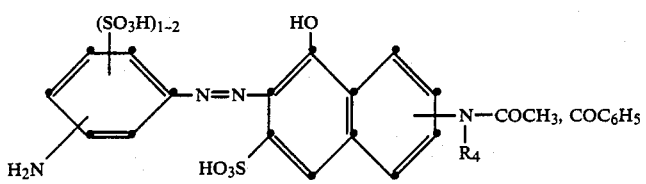

-continued
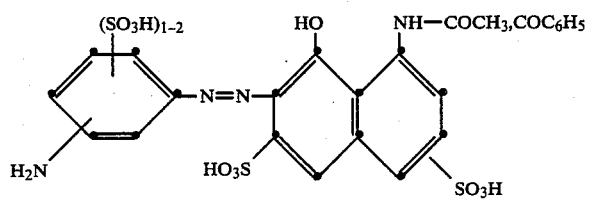
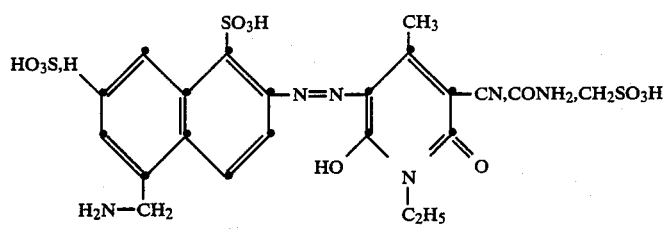
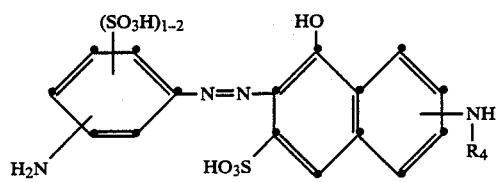
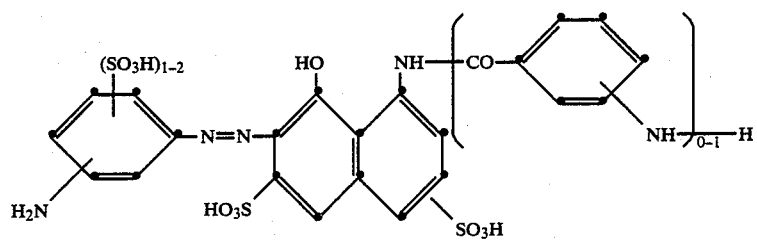
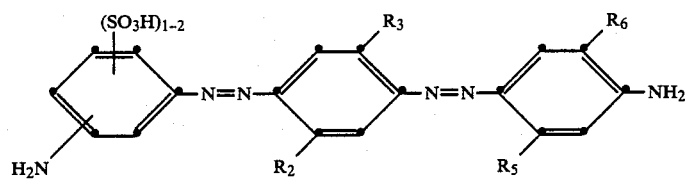
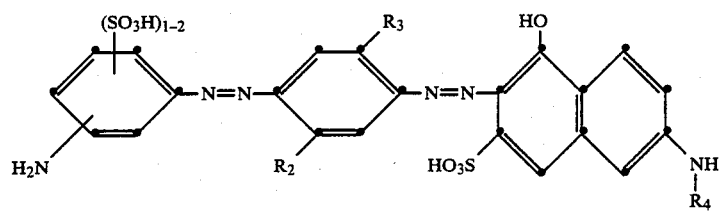
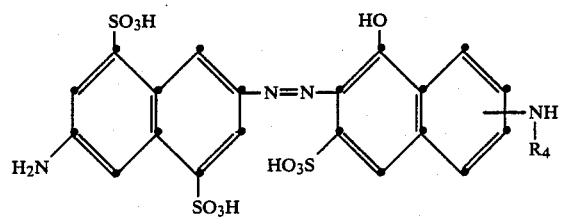

-continued
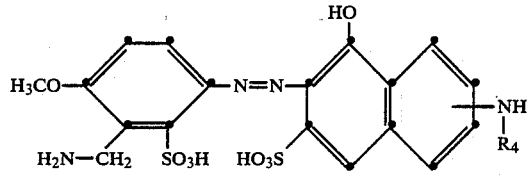
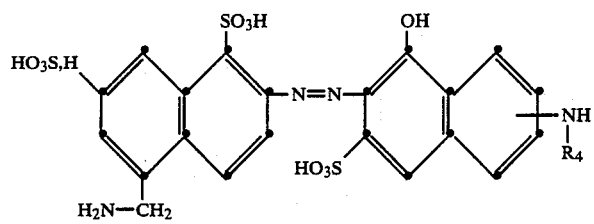
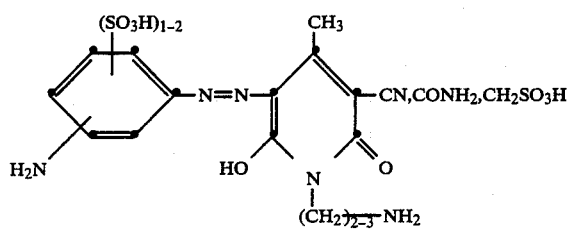
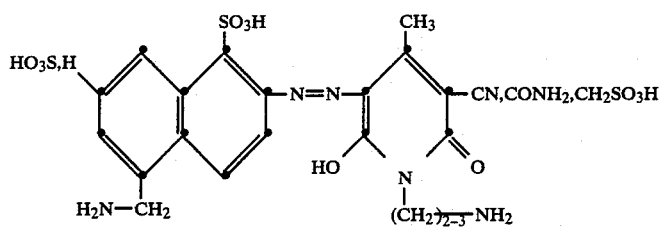
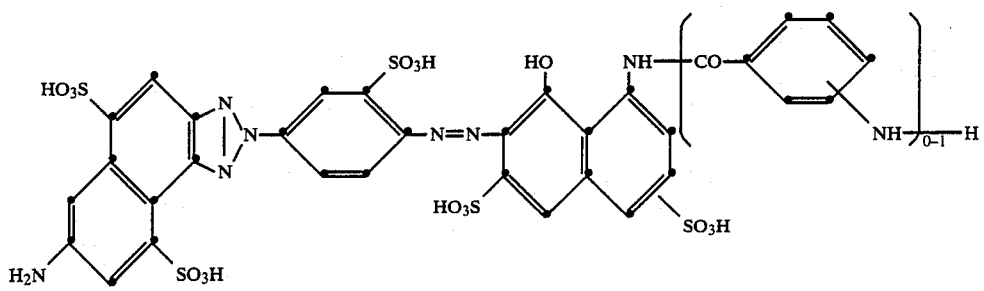
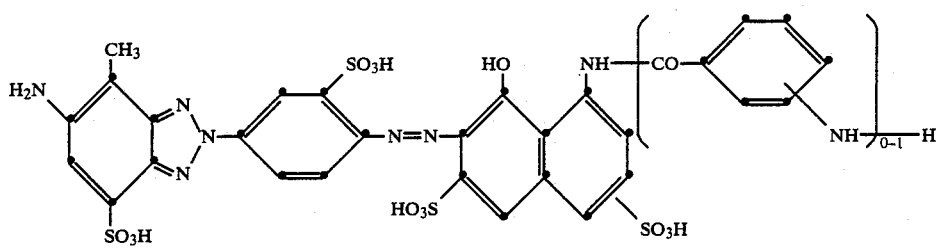
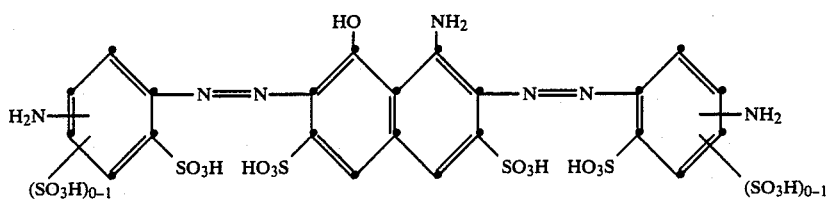

In the formulae listed above, $R_2$, $R_3$, $R_5$ and $R_6$ independently of one another are e.g. hydrogen, $C_1$–$C_4$-alkyl, $C_1$–$C_4$-alkoxy, $C_1$–$C_4$-alkanoylamino, ureido or halogen and $R_4$ is e.g. hydrogen or $C_1$–$C_4$-alkyl.

(b) Metal complexes of monoazo or disazo dyes of formula (2) or (3) given above which contain groups capable of metal complex formation, e.g. hydroxyl, carboxyl, amino or sulfo groups.

If Fa in formula (1) is the radical of a metal complex azo dye, it can be derived e.g. from a metal complex of the dyes given below:

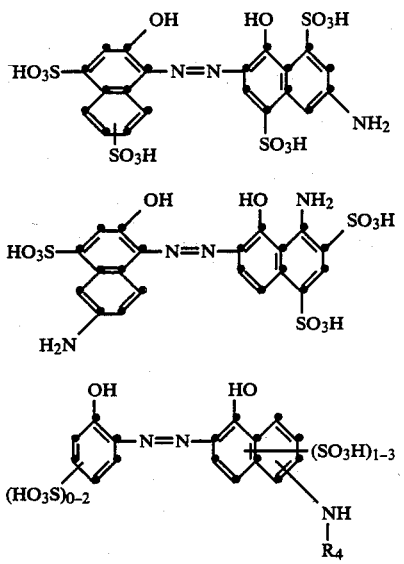

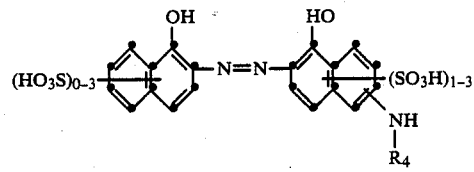

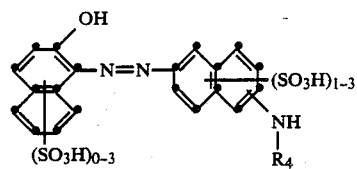

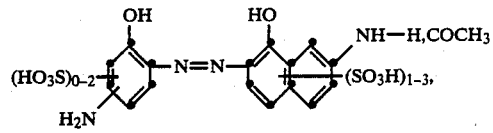

wherein $R_4$ is in each case as defined above.

Preferred metal atoms are Cu (1:1 complex) or Cr and Co (1:2 complex). The azo compound of the formula given above can occur once or twice in Cr and Co complexes, i.e. these complexes can have a symmetrical structure or an unsymmetrical structure with any other ligands.

Examples of suitable copper complex dyes which can be based on the radical Fa in formula (1) are:

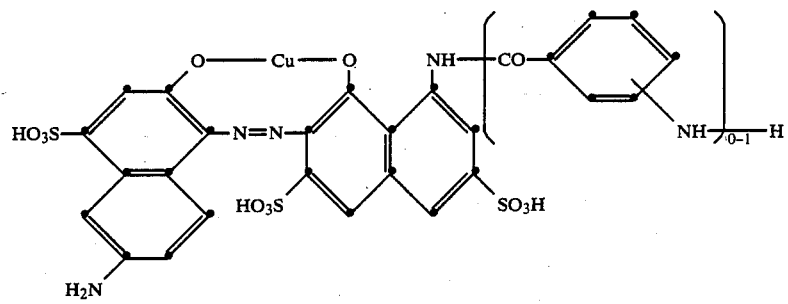

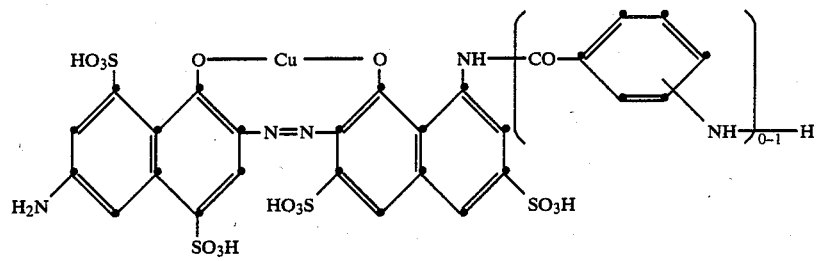

(c) Anthraquinone dyes of the formula (4)

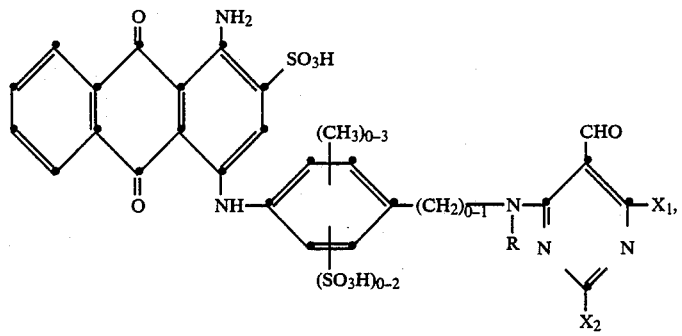

wherein R, $X_1$ and $X_2$ are each as defined above.

(d) Formazane dyes of the formula

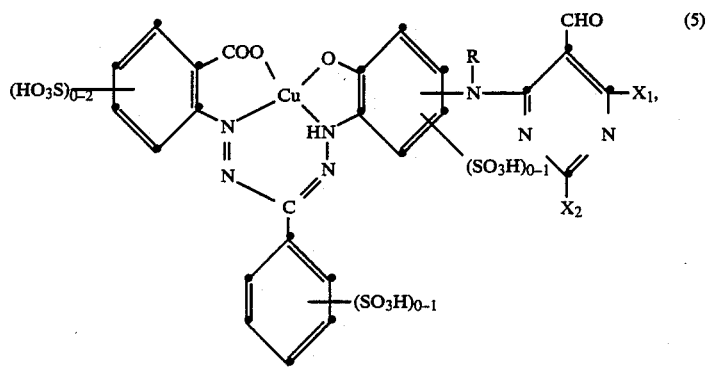

wherein R, $X_1$ and $X_2$ are each as defined above.

(e) Phthalocyanine dyes of the formula (6)

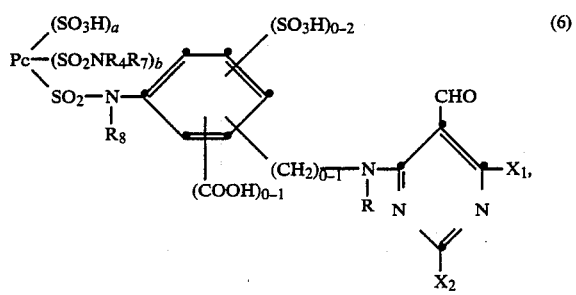

wherein R, $X_1$ and $X_2$ are each as defined above, Pc is the radical of a Cu or Ni phthalocyanine, $R_4$, $R_7$ and $R_8$ independently of one another are $C_1$–$C_4$-alkyl and in particular hydrogen and a and b are integers or fractions from 1 to 3, a and b together adding up to 3.0.

(f) Reactive dyes of formula (1) wherein Fa is e.g. a radical of a dioxazine dye of the formula

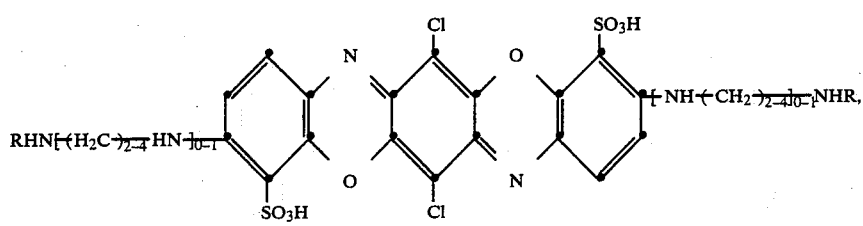

wherein R is as defined above.

The reactive dyes of the invention can be prepared e.g. by condensing organic dyes of the formula $$Fa\left[\begin{array}{c}N-H\\|\\R\end{array}\right]_r$$

or dye precursors with at least one equivalent of a pyrimidine of the formula (8)

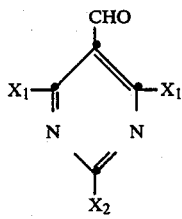

(9)

to give a reactive dye of formula (1), wherein Fa, R, $X_1$, $X_2$ and r are each as defined above, and, in the case where dye precursors are used, converting these into the desired final dyes.

The process of the invention may be followed by a further conversion reaction. When the final dyes are prepared from precursors, these reactions are in particular coupling reactions yielding azo dyes.

Another possible conversion reaction is a subsequent reaction on the radical $X_1$ or $X_2$. If desired, removable radicals $X_1$ or $X_2$ can be exchanged with other removable radicals after the pyrimidine of formula (9) has been condensed with a dye of formula (8) or a dye precursor. Thus one halogen atom can be exchanged with another, e.g. by reaction with a halogenating agent. Reaction with tertiary bases, such as trimethylamine, pyridine or 1,4-diazabicyclo[2,2,2]octane, gives corresponding ammonium compounds and quaternization with hydrazines, such as N,N-dimethylhydrazine, gives corresponding hydrazinium compounds. With sulfides, e.g. sodium sulfite, and sulfinates it is possible to exchange halogen with the sulfo groups or a sulfonyl group, e.g. the 3'-carboxyphenylsulfonyl group and the like. Reaction with cyanides, e.g. potassium cyanide, and thiocyanates, e.g. potassium thiocyanate, makes it possible to replace chlorine with the nitrile or thiocyanate group, which are also reactive. Furthermore, reaction with sodium azide or compounds containing reactive methylene groups, e.g. ethyl cyanoacetate, ethyl malonate and acetylacetone, also makes it possible to exchange halogen atoms or other reactive groups with the corresponding radicals. In many cases the replacement of a removable substituent $X_1$ and/or $X_2$ with another removable substituent can also take place before the pyrimidine of formula (9) is condensed with a dye of formula (8) or a dye precursor.

The process variant which starts from dye precursors is suitable for the preparation of reactive dyes of formula (1) wherein Fa is the radical of a dye made up of two or more than two components. Examples of such dyes made up of two or more than two components are: monoazo, disazo, trisazo, metal complex azo, formazane and azomethine dyes. In principle all classes of reactive dyes of formula (1) can be prepared in a manner known per se or analogously to known procedures by starting from dye precursors or intermediates containing fibre-reactive radicals according to formula (1) or introducing these fibre-reactive radicals into dye-like intermediates suitable for this purpose.

If the starting materials are dye precursors, the reactive dyes of formula (1) are obtained e.g. by condensing one component of the dye of formula (8) containing a group —N(R)H with a pyrimidine of formula (9) and then reacting the product with the other component of the dye of formula (8). In the preparation of the preferred azo dyes, the diazo components and the coupling components must together have at least one amino group —N(R)H and the diazo components must also contain an amino group, —NH$_2$. The diazo components used in this case are, in particular, 1,3-phenylenediamine-4-sulfonic acid, 1,4-phenylenediamine-2-sulfonic acid, 1,4-phenylenediamine-2,5-disulfonic acid or 1,3-phenylenediamine-4,6-disulfonic acid. If necessary, corresponding acetylamino or nitro compounds are used, the acetylamino or nitro group being converted to the H$_2$N— group, by saponification or reduction, before the condensation reaction with the 2,4,6-trihalogenopyrimidine.

If the reactive dyes prepared contain groups capable of metal complex formation, such as hydroxyl, carboxyl, amino or sulfo, the reactive dyes can also be metallized afterwards. For example, metal complex azo dyes are obtained by treating azo compounds prepared according to the invention, which contain complex-forming groups in the ortho, ortho' positions relative to the azo bridge, e.g. hydroxyl or carboxyl groups, with heavy metal donors, this treatment being carried out before or, if appropriate, after the condensation reaction with the 2,4,6-trihalogenopyrimidine of formula (9). Copper complexes of reactive dyes of formula (1) are of particular interest. Other possible methods of metallization apart from the one mentioned above are dealkylating metallization and, for the preparation of copper complexes, oxidising coppering.

The most important process variants are illustrated in the Examples of embodiments of the invention.

The compounds of formula (8) are known or can be prepared in a manner known per se. A selection of useful compounds of formula (8) can be found in the discussion of the preferred subgroups of the reactive dyes of the invention.

Likewise the pyrimidine compounds of formula (9) are known e.g. from German Offenlegungsschrift 2,310,334 or from H. Bredereck et al., Liebigs Annalen d. Chemie 766, 73–88 (1972), or can be prepared by methods similar to those disclosed therein.

The reactive dyes of the invention of formula (1) are suitable for dyeing and printing a very wide range of materials such as silk, leather, wool and polyamide fibres, and especially cellulosic fibre materials of all kinds. Such fibre materials are, for example, the natural cellulose fibres such as cotton, linen and hemp, as well as pulp and regenerated cellulose. The reactive dyes of the invention are also suitable for dyeing or printing fibres which contain hydroxyl groups and which are components of blended fabrics, e.g. blends of cotton with polyester fibres or polyamide fibres.

The dyes of formula (1) can be applied in various ways to the fibre material and fixed thereon, especially in the form of aqueous dye solutions and printing pastes. The dyes of formula (1) are suitable both for the exhaust process and for dyeing by the pad dyeing process, in which the goods are impregnated with aqueous dye solutions which may also contain salts, and the dyes are fixed after treatment with alkali, or in the presence of alkali, with or without the application of heat. The dyes of formula (1) are particularly suitable for the so-called cold pad-batch process, which comprises applying the dye together with the alkali to the pad and subsequently fixing the dye by storing the impregnated goods for several hours at room temperature. After fixation the dyeings or prints are thoroughly rinsed with cold and hot water, if necessary with the addition of a compound which acts as a dispersant and promotes the diffusion of non-fixed dye.

The reactive dyes of the invention are distinguished by high reactivity, good fixation and good build-up. They can therefore be applied by the exhaust dyeing process at low dyeing temperatures and require only short steaming times when used in the pad-steam process. The degrees of fixation are high and non-fixed dye can be readily washed off. The difference between degree of exhaustion and degree of fixation is remarkably small, i.e. the soap loss is very small. The reactive dyes of the invention are also particularly suitable for printing, especially on cotton, and for printing nitrogen-containing fibres, e.g. wool, silk or blended fabrics containing wool or silk.

The dyeings and prints prepared with the dyes of the invention of formula (1) on cellulose fibre materials have high colour strength and high dye-fibre bond stability both in acid and in alkaline medium, and they also have good lightfastness and very good wetfastness properties such as fastness to washing, water, sea-water, cross-dyeing and perspiration, as well as good fastness to pleating, ironing and rubbing.

The following Examples will serve to illustrate the invention. The temperatures are given in degrees Celsius and the parts and percentages are by weight, unless stated otherwise. The ratio of parts by weight to parts by volume is the same as that of kilograms to liters.

EXAMPLE 1

21.6 g of the aminoazo dye of the formula

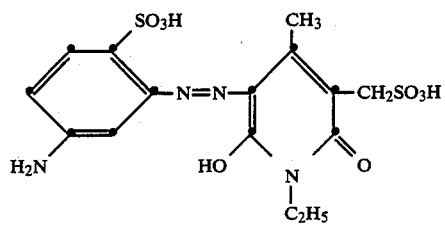

are dissolved in 120 ml of water to give a neutral solution and acylated with a solution of 10.6 g of 2,4,6-trichloro-5-formylpyrimidine in 60 ml of acetone at a temperature of 0°–5° C., the pH being kept between 6 and 7 by the dropwise addition of 2N sodium hydroxide solution.

When acylation is complete, the dye suspension is filtered and the dye obtained is purified by precipitation with sodium chloride and stabilized with disodium hydrogenphosphate, affording the dye of the formula

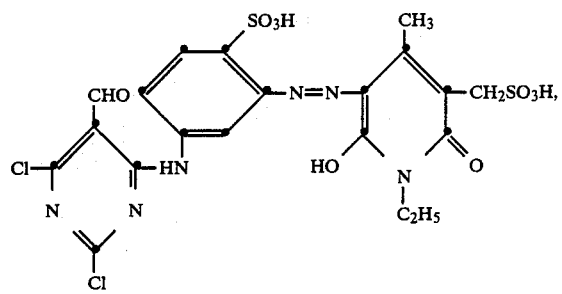

which dyes cotton in greenish yellow shades with good general fastness properties.

EXAMPLES 2-7

The procedure described in Example 1 is repeated and the dyes given in Table 1 below are used instead of the aminoazo dye used in the said Example, affording analogous reactive dyes which dye cotton in the shade given:

TABLE 1

| Example no. | Dye | Shade on cotton |
|---|---|---|
| 2 | (structure shown) | greenish yellow |
| 3 | (structure shown) | red |

TABLE 1-continued

| Example no. | Dye | Shade on cotton |
|---|---|---|
| 4 | (structure) | bluish red |
| 5 | (structure) | claret |
| 6 | (structure) | golden yellow |
| 7 | (structure) | blue |

EXAMPLE 8

8.18 g of the aminoazo dye of the formula

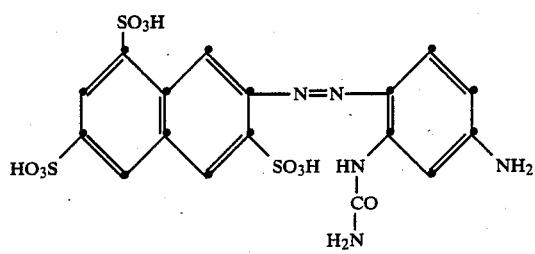

are dissolved in 200 ml of water to give a neutral solution and acylated with a solution of 3.7 g of 2-methyl-5-formyl-4,6-dichloropyrimidine in 20 ml of acetone at a temperature of 20°-25° C., the pH of the reaction medium being kept at 6.5 to 7 by the dropwise addition of 2N sodium hydroxide solution. The dye which precipitates over 20 hours is isolated by filtration, stabilized with disodium hydrogenphosphate and dried under vacuum; it has the formula

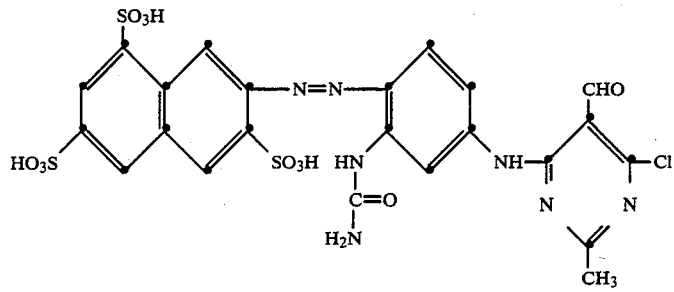

and dyes cotton in golden yellow shades with good general fastness properties.

EXAMPLES 9–36

The procedure described in Example 1 or 8 is repeated and the dyes given in column 2 of Table 2 are reacted with the pyrimidine compounds listed in column 3, affording analogous dyes which dye cotton in the shade given:

TABLE 2

| Example no. | Dye | Pyrimidine compound | Shade on cotton |
|---|---|---|---|
| 9 | (structure) | 2,4,6-trichloro-5-formyl-pyrimidine | yellow |
| 10 | (structure) | 2,4,6-trichloro-5-formyl pyrimidine | yellow |
| 11 | (structure) | 2,4,6-trichloro-5-formyl-pyrimidine | yellow |
| 12 | (structure) | 2,4,6-trichloro-5-formyl-pyrimidine | yellow |

TABLE 2-continued

| Example no. | Dye | Pyrimidine compound | Shade on cotton |
|---|---|---|---|
| 13 | (structure) | 2,4,6-trichloro-5-formyl-pyrimidine | navy blue |
| 14 | (structure) | 2,4,6-trichloro-5-formyl-pyrimidine | navy blue |
| 15 | (structure) | 2,4,6-trichloro-5-formyl-pyrimidine | navy blue |
| 16 | (Cu complex structure) | 2,4,6-trichloro-5-formyl-pyrimidine | blue |
| 17 | (Cu complex structure) | 2,4,6-trichloro-5-formyl-pyrimidine | blue |
| 18 | (structure) | 2,4,6-trichloro-5-formyl-pyrimidine | blue |

TABLE 2-continued

| Example no. | Dye | Pyrimidine compound | Shade on cotton |
|---|---|---|---|
| | (only one amino group is involved in the reaction) | | |
| 19 | [anthraquinone dye structure with NH2, SO3H, and substituted aniline with H3C, CH3, NH2, SO3H groups] | 2,4,6-trichloro-5-formyl-pyrimidine | blue |
| 20 | [azo dye: H2C=HC—O2S–phenyl–N=N–naphthol with OH, NH2, HO3S, SO3H] | 2,4,6-trichloro-5-formyl-pyrimidine | red |
| 21 | [disazo dye with O2S-CH=CH2 vinylsulfone, phenyl-N=N-naphthol(OH,NH2)-N=N-phenyl-NH2, with HO3S, SO3H, HO3S] | 2,4,6-trichloro-5-formyl-pyrimidine | navy blue |
| 22 | [disazo dye with O2S-CH=CH2, phenyl-N=N-naphthol(NH2,OH)-N=N-phenyl-NH2, with HO3S, SO3H, HO3S, SO3H] | 2,4,6-trichloro-5-formyl-pyrimidine | navy blue |
| 23 | [naphthalene trisulfonic acid-N=N-phenyl-NH2, with SO3H, HO3S, SO3H] | 2-methyl-5-formyl-4,6-di-chloro-pyrimidine | yellow |
| 24 | [pyrazolone dye with HOOC, N=N-phenyl-NH2, OH, HO3S, and naphthyl group with HO3S, SO3H] | 2-methyl-5-formyl-4,6-di-chloro-pyrimidine | yellow |

| | | | |
|---|---|---|---|
| 25 | 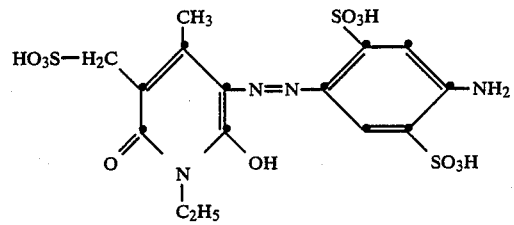 | 2-methyl-5-formyl-4,6-dichloro-pyrimidine | yellow |
| 26 | 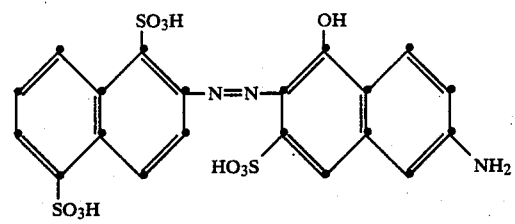 | 2-methyl-5-formyl-4,6-dichloro-pyrimidine | orange |
| 27 | 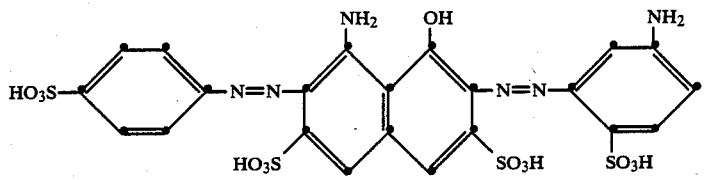 | 2-methyl-5-formyl-4,6-dichloro-pyrimidine | navy blue |
| 28 | 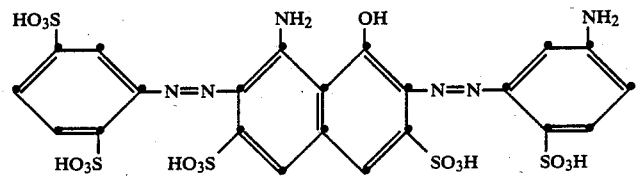 | 2-methyl-5-formyl-4,6-dichloro-pyrimidine | navy blue |
| 29 | 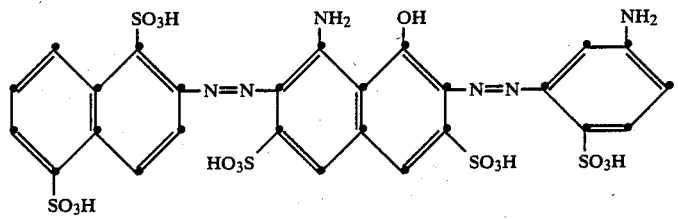 | 2-methyl-5-formyl-4,6-dichloro-pyrimidine | navy blue |
| 30 | 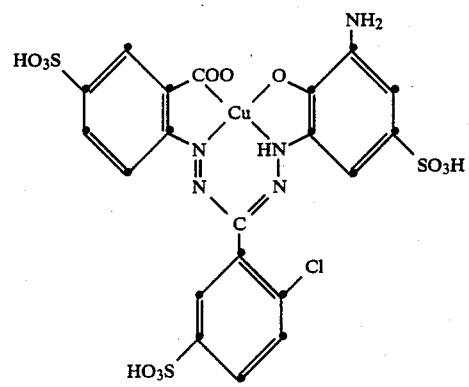 | 2-methyl-5-formyl-4,6-dichloro-pyrimidine | blue |

| | | | |
|---|---|---|---|
| 31 | 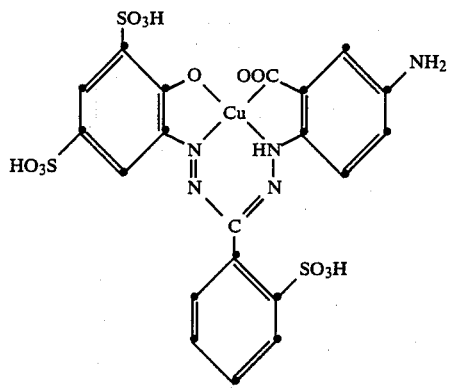 | 2-methyl-5-formyl-4,6-dichloropyrimidine | blue |
| 32 | 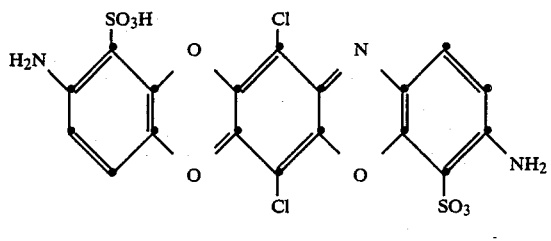  (only one amino group is involved in the reaction) | 2-methyl-5-formyl-4,6-dichloropyrimidine | blue |
| 33 | 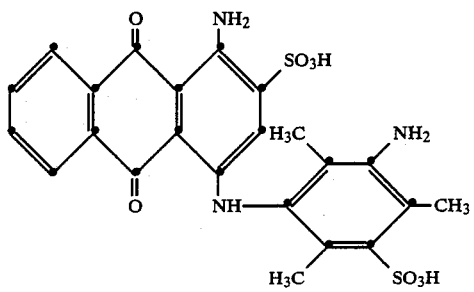 | 2-methyl-5-formyl-4,6-dichloropyrimidine | blue |
| 34 | 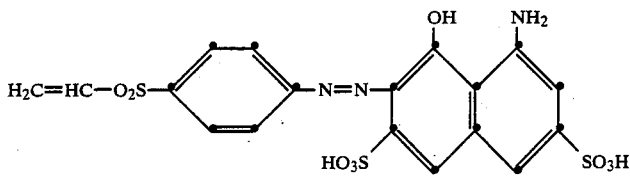 | 2-methyl-5-formyl-4,6-dichloropyrimidine | red |
| 35 | 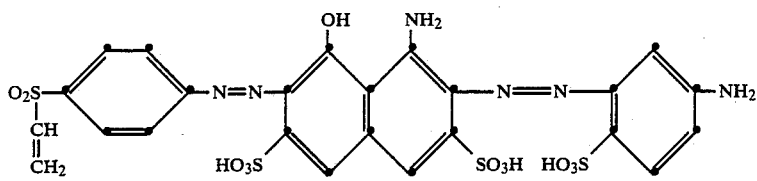 | 2-methyl-5-formyl-4,6-dichloropyrimidine | navy blue |
| 36 | 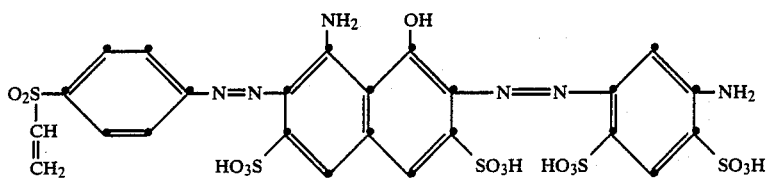 | 2-methyl-5-formyl-4,6-dichloropyrimidine | navy blue |

| | | |
|---|---|---|
| 37 | 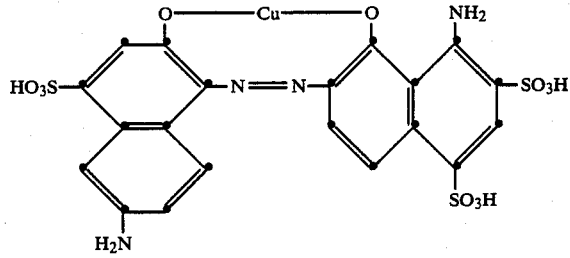 | 2-methyl-5-formyl-4,6-dichloropyrimidine | blue |
| 38 | 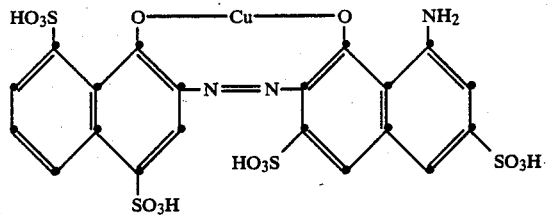 | 2,4,6-trichloro-5-formylpyrimidine | blue |

Dyeing procedure I 2 parts of the dye obtained in Example 1 are dissolved in 400 parts of water. To this solution are added 1500 parts of a solution containing 53 g of sodium chloride per liter. 100 parts of a cotton fabric are put into this dyebath at 40° C., and, after 45 minutes, 100 parts of a solution containing 16 g of sodium hydroxide and 20 g of calcined sodium carbonate per liter are added. The temperature of the dyebath is kept at 40° C. for a further 45 minutes. The dyed goods are then rinsed, soaped at the boil for a quarter for an hour with a non-ionic detergent, rinsed again and dried.

Dyeing procedure II 2 parts of the reactive dye obtained in Example 1 are dissolved in 400 parts of water. To this solution are added 1500 parts of a solution containing 53 g of sodium chloride per liter. 100 parts of a cotton fabric are put in to this dyebath at 35° C. and, after 20 minutes, 100 parts of a solution containing 16 g of sodium hydroxide and 20 g of calcined sodium carbonate per liter are added. The temperature of the dyebath is kept at 35° C. for a further 15 minutes. The temperature is then raised to 60° C. over 20 minutes and kept at 60° C. for a further 35 minutes. The dyed goods are then rinsed, soaped at the boil for a quarter of an hour with a non-ionic detergent, rinsed again and dried.

Dyeing procedure III 8 parts of the reactive dye obtained in Example 1 are dissolved in 400 parts of water. To this solution are added 1400 parts of a solution containing 100 g of sodium sulfate per liter. 100 parts of a cotton fabric are put into this dyebath at 25° C. and, after 10 minutes, 200 parts of a solution containing 150 g of trisodium phosphate per liter are added and the temperature of the dyebath is then raised to 60° C. over 10 minutes. The temperature is kept at 60° C. for a further 90 minutes. The dyed goods are then rinsed, soaped at the boil for a quarter of an hour with a non-ionic detergent, rinsed again and dried.

Dyeing procedure IV 4 parts of the reactive dye obtained in Example 1 are dissolved in 50 parts of water. To this solution are added 50 parts of a solution containing 5 g of sodium hydroxide and 20 g of calcined sodium carbonate per liter. A cotton fabric is padded with this liquor to a pick-up of 70% and then rolled up. The cotton fabric is then stored for 3 hours at room temperature. The dyed goods are then rinsed, soaped at the boil for a quarter of an hour with a non-ionic detergent, rinsed again and dried.

Dyeing procedure V 6 parts of the reactive dye obtained in Example 1 are dissolved in 50 parts of water. To this solution are added 50 parts of a solution containing 16 g of sodium hydroxide and 0.04 liter of water glass (38°) per liter. A cotton fabric is padded with this liquor to a pick-up of 70% and then rolled up. The cotton fabric is then stored for 10 hours at room temperature. The dyed goods are then rinsed, soaped at the boil for a quarter of an hour with a non-ionic detergent, rinsed again and dried.

Dyeing procedure VI 2 parts of the reactive dye obtained in Example 1 are dissolved in 100 parts of water with the addition of 0.5 part of sodium m-nitrobenzenesulfonate. A cotton fabric is impregnated with this liquor to a pick-up of 75% and then dried. The fabric is then impregnated with a warm solution, at 20° C., containing 4 g of sodium hydroxide and 300 g of sodium chloride per liter, and pinched off to a pick-up of 75%. The dyeing is steamed for 30 seconds at 100 to 102° C., rinsed, soaped for a quarter of an hour in a 0.3% boiling solution of a non-ionic detergent, rinsed and dried.

Printing procedure I 3 parts of the reactive dye obtained in Example 1 are sprinkled, with rapid stirring, into 100 parts of a stock thickening containing 50 parts of 5% sodium alginate thickening, 27.8 parts of water, 20 parts of urea, 1 part of sodium m-nitrobenzenesulfonate and 1.2 parts of sodium bicarbonate. A cotton fabric is printed with this printing paste and dried. The printed fabric obtained is steamed for 2 minutes at 102° C. in saturated steam and then rinsed, soaped at the boil if necessary, rinsed again and then dried.

Printing procedure II 5 parts of the reactive dye obtained in Example 1 are sprinkled, with rapid stirring, into 100 parts of a stock thickening containing 50 parts of 5% sodium alginate thickening, 36.5 parts of water, 10 parts of urea, 1 part of sodium m-nitrobenzenesulfonate and 2.5 parts of sodium bicarbonate. A cotton fabric is printed with this printing paste, the stability of which meets the technical requirements, and dried. The printed fabric obtained is steamed for 8 minutes at 102° C. in saturated steam and then rinsed, soaped at the boil if necessary, rinsed again and then dried.

What is claimed is:

1. A fiber-reactive dye of the formula

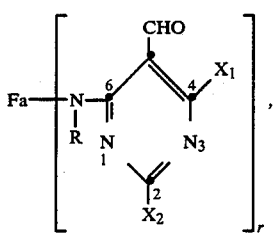

(1)

wherein Fa is a monoazo or polyazo, metal complex azo, anthraquinone, phthalocyanine, formazane, azomethine, dioxazine, phenazine, stilbene, triphenylmethane, xanthene, thioxanthone, nitroaryl, naphthoquinone, pyrenequinone or perylenetetracarbimide dye radical, $X_1$ is halogen, $C_1$–$C_4$-alkylsulfonyl, phenylsulfonyl, a sulfonic acid or phosphoric acid group or a quaternized ammonium group, $X_2$ independently has the meaning of $X_1$ or is $C_1$–$C_4$-alkyl which is unsubstituted or substituted by halogen, hydroxy, cyano, carboxyl, sulfo, sulfato, $C_1$–$C_4$-alkoxycarbonyl or $C_1$–$C_4$ alkoxy, R is hydrogen or $C_1$–$C_4$-alkyl which is unsubstituted or substituted by halogen, hydroxy, cyano, carboxyl, sulfo, sulfato, $C_1$–$C_4$-alkoxycarbonyl or $C_1$–$C_4$-alkoxy, and r is 1 or 2.

2. A fiber-reactive dye according to claim 1, wherein r=1.

3. A fiber-reactive dye according to claim 1, wherein $X_1$ is chlorine or fluorine.

4. A fiber-reactive dye according to claim 1, wherein $X_2$ is chlorine, fluorine or methyl, ethyl or n- or iso-propyl each of which is unsubstituted or substituted by fluorine, chlorine, hydroxyl, sulfo or sulfato.

5. A fiber-reactive dye according to claim 4, wherein $X_2$ is chlorine, fluorine, methyl or ethyl.

6. A fiber-reactive dye according to claim 1, wherein $X_1$ and $X_2$ are each fluorine or chlorine.

7. A fiber-reactive dye according to claim 1, wherein $X_1$ is fluorine or chlorine and $X_2$ is methyl or ethyl.

8. A fiber-reactive dye according to claim 1, wherein R is hydrogen, methyl or ethyl.

9. A fiber-reactive dye according to claim 1, wherein Fa is unsubstituted or substituted by $C_1$–$C_4$-alkyl, $C_1$–$C_4$-alkoxy, $C_1$–$C_4$-alkanoylamino, benzoylamino, amino, N-mono- or N,N-di-$C_1$–$C_4$-alkyl-amino which is unsubstituted or substituted in the alkyl moiety by —OH, —OCOCH$_3$, —OSO$_3$H, —CN or halogen, phenylamino, mono- or di-sulfobenzylamino, $C_1$–$C_4$-alkoxycarbonyl, $C_1$–$C_4$-alkylsulfonyl, trifluoromethyl, nitro, cyano, halogen, carbamoyl, N-mono- or N,N-di-$C_1$–$C_4$-alkylcarbamoyl, sulfamoyl, N-mono- or N,N-di-$C_1$–$C_4$-alkylsulfamoyl, N-mono- or N,N-di($\beta$-hydroxyethyl)sulfamoyl, N-phenylsulfamoyl, hydroxyl, carboxyl, sulfo, sulfomethyl or ureido.

10. A fiber-reactive dye according to claim 1, wherein Fa is a monoazo or polyazo, metal complex azo, anthraquinone, phthalocyanine, formazane or dioxazine dye radical, which is substituted by one or more radicals selected from the group consisting of $C_1$–$C_4$-alkyl, $C_1$–$C_4$-alkoxy, $C_1$–$C_4$-alkanoylamino, benzoylamino, amino, N-mono- or N,N-di-$C_1$–$C_4$-alkylamino which is unsubstituted or substituted in the alkyl moiety by —OH, —OCOCH$_3$, —OSO$_3$H, —CN or halogen, phenylamino, mono- or disulfobenzylamino, $C_1$–$C_4$-alkoxycarbonyl, $C_1$–$C_4$-alkylsulfonyl, trifluoromethyl, nitro, cyano, halogen, carbamoyl, N-mono- or N,N-di-$C_1$–$C_4$-alkylcarbamoyl, sulfamoyl, N-mono- or N,N-di-$C_1$–$C_4$-alkylsulfamoyl, N-mono- or N,N-di($\beta$-hydroxyethyl)sulfamoyl, N-phenylsulfamoyl, hydroxyl, carboxyl, sulfo, sulfomethyl or ureido.

11. A fiber-reactive dye according to claim 1, wherein Fa is a monoazo or disazo dye radical, which is substituted by one or more radicals selected from the group consisting of methyl, ethyl, methoxy, ethoxy, acetylamino, benzoylamino, amino, chlorine, bromide, ureido, hydroxyl, carboxyl, sulfomethyl and sulfo.

12. A fiber-reactive dye of formula (1) according to claim 1, wherein Fa is a monoazo or polyazo, metal complex azo, anthraquinone, phthalocyanie, formazane or dioxazine dye radical, which carries one or more sulfo groups and is further unsubstituted or substituted by one or more radicals selected from the group consisting of $C_1$–$C_4$-alkyl, $C_1$–$C_4$-alkoxy, $C_1$–$C_4$-alkanoylamino, benzoylamino, amino, N-mono- or N,N-di-$C_1$–$C_4$-alkylamino benzoylamino, amino, N-mono- or N,N-di-$C_1$–$C_4$-alkylamino which is unsubstituted or substituted in the alkyl moiety by —OH, —OCOCH$_3$, —OSO$_3$H, —CN or halogen, phenylamino, mono- or disulfobenzylamino, $C_1$–$C_4$-alkoxycarbonyl, $C_1$–$C_4$-alkylsulfonyl, trifluoromethyl, nitro, cyano, halogen, carbamoyl, N-mono- or N,N-di-$C_1$–$C_4$-alkylcarbamoyl, sulfamoyl, N-mono- or N,N-di-$C_1$–$C_4$-alkylsulfamoyl, N-mono- or N,N-di($\beta$-hydroxyethyl)sulfamoyl, N-phenylsulfamoyl, hydroxyl, carboxyl, sulfo, sulfomethyl or ureido, R is hydrogen or a $C_1$–$C_4$-alkyl radical which is unsubstituted or substituted by halogen, hydroxyl, cyano, carboxyl, sulfo, sulfato, $C_1$–$C_4$-alkoxycarbonyl or $C_1$–$C_4$ -alkoxy, $X_1$ is chlorine or fluorine, $X_2$ is chlorine, fluorine or a methyl, ethyl or n- or iso-propyl radical which is unsubstituted or substituted by fluoride, chlorine, hydroxyl, sulfo or sulfato, and r is 1.

13. A reactive dye of the formula

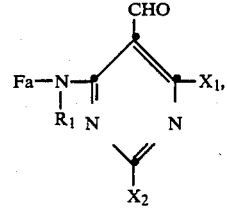

(1a)

wherein Fa is a monoazo or polyazo, metal complex azo, anthraquinone, phthalocyanine, formazane or dioxazine dye radical, $R_1$ is hydrogen, methyl or ethyl, $X_1$ is chlorine or fluorine and $X_2$ is chlorine, fluorine, methyl or ethyl.

14. A reactive dye according to claim 1 of the formula

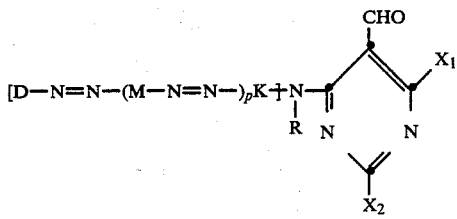

or

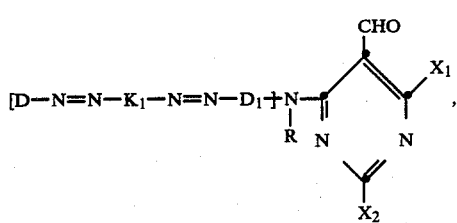

wherein D and $D_1$ independently of one another are a diazo component benzene or naphthalene radical, M is a middle component benzene or naphthalene radical, K is a coupling component benzene, naphthalene or heterocyclic radical, $K_1$ is a coupling component aminonaphtholsulfonic acid radical and p is 0 to 1.

15. A reactive dye according to claim 1, which is a metal complex of a monoazo or disazo dye of formula

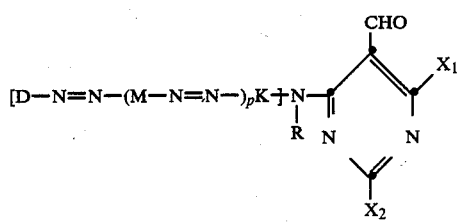

or

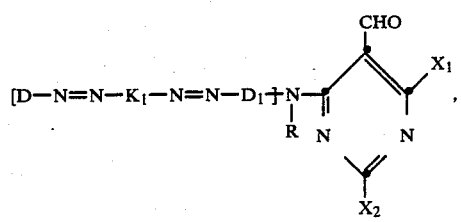

wherein D and $D_1$ independently of one another are a diazo component benzene or naphthalene radical, M is a middle component benzene or naphthalene radical, K is a coupling component benzene, naphthalene or heterocyclic radical, $K_1$ is a coupling component aminonaphtholsulfonic acid radical and p is 0 or 1.

16. A reactive dye according to claim 1 of the formula

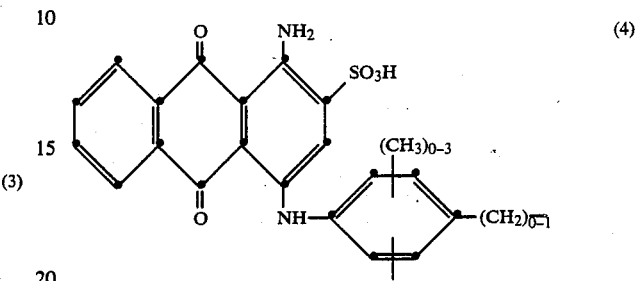

17. A reactive dye according to claim 1 of the formula

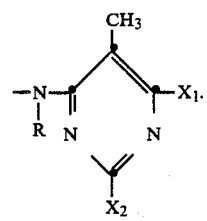

18. A reactive dye according to claim 1 of the formula

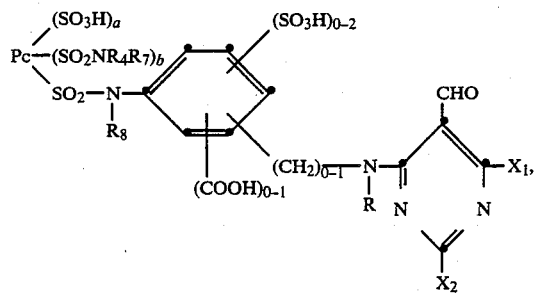
(6)
19. A reactive dye of formula (1) according to claim 1, wherein Fa is a dioxazine dye radical of the formula
(7)
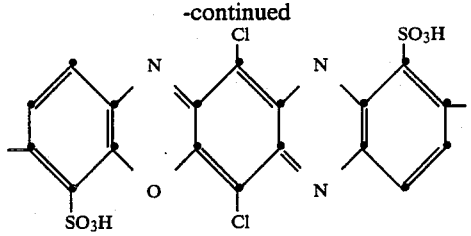
* * * * *